July 21, 1931.  W. O. MARTIN  1,815,859
SLACK ADJUSTER
Filed Aug. 26, 1929   3 Sheets-Sheet 1
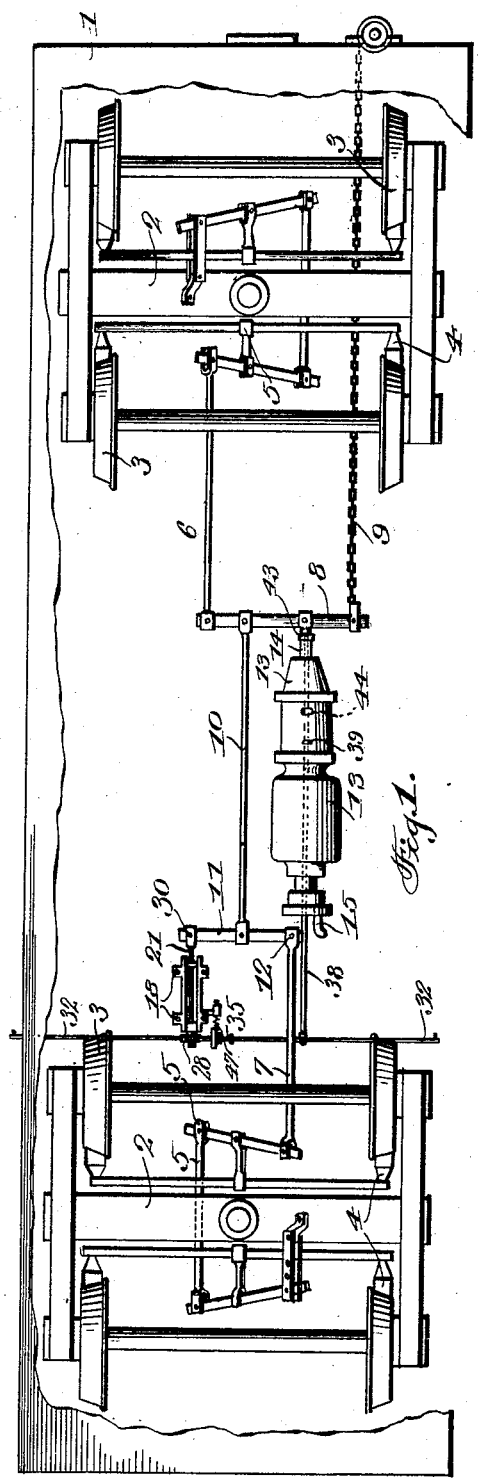
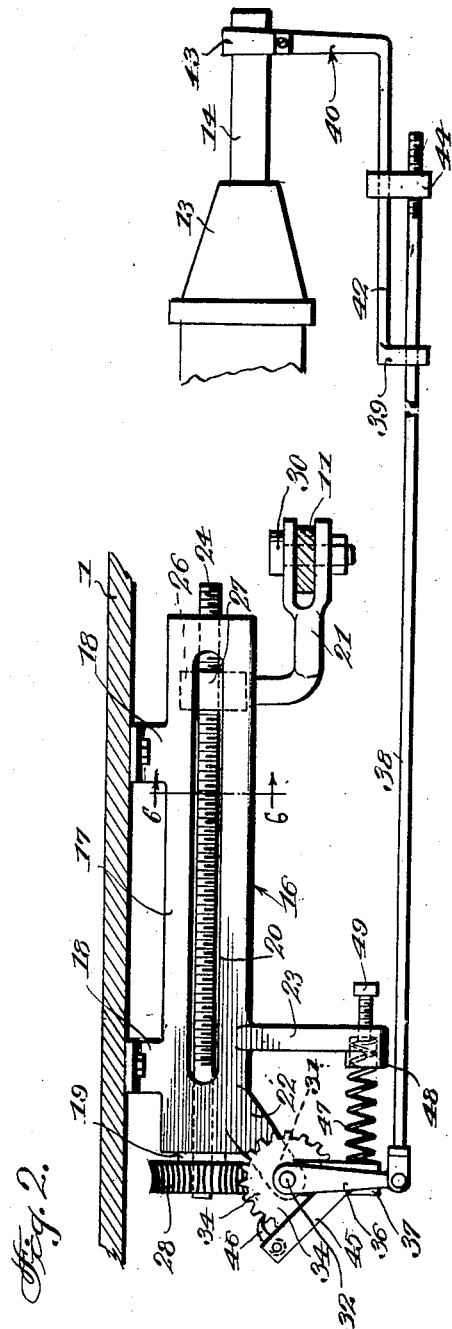
INVENTOR
William O Martin
BY
ATTORNEY

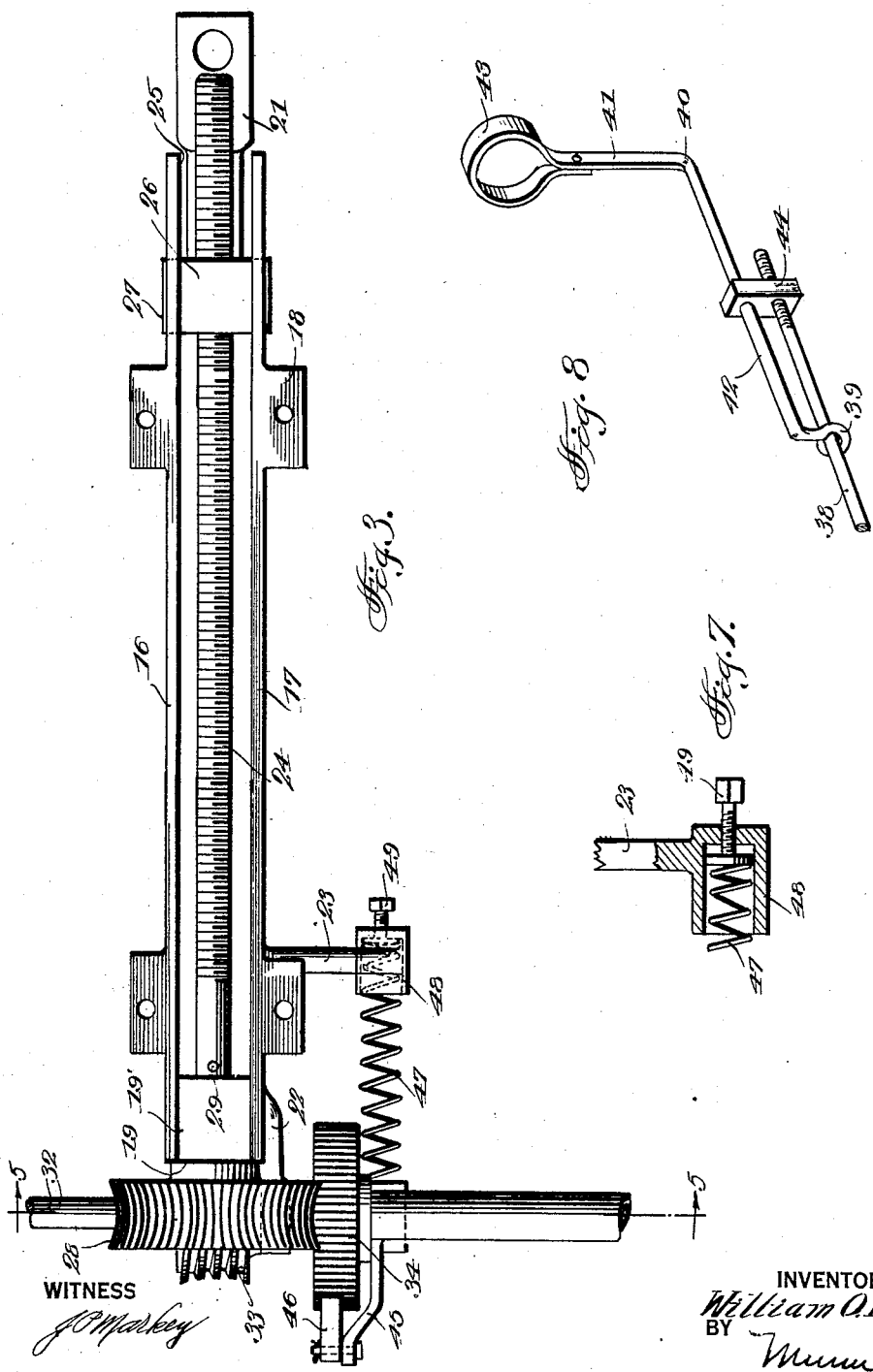

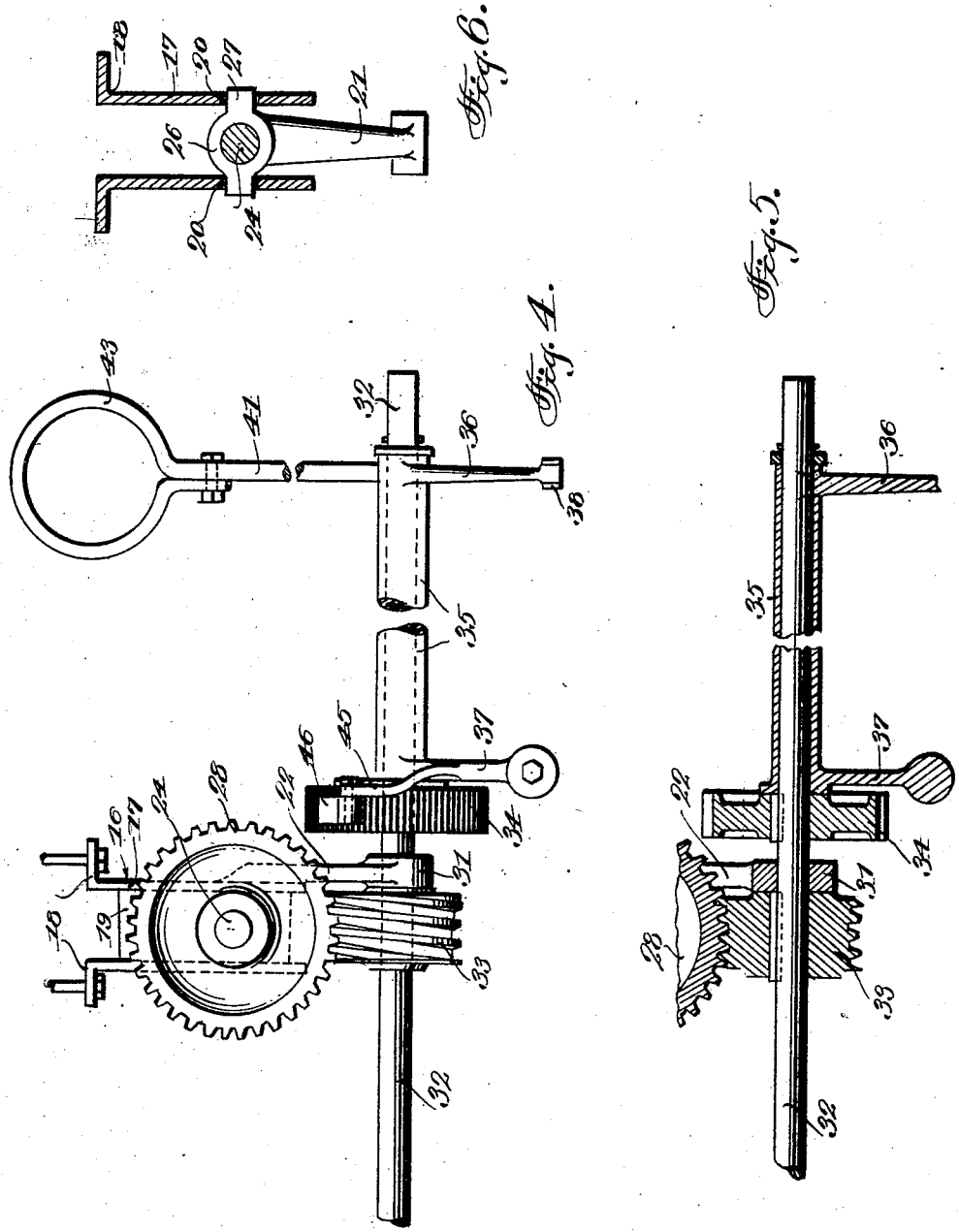

Patented July 21, 1931

1,815,859

UNITED STATES PATENT OFFICE

WILLIAM O. MARTIN, OF PARIS, ARKANSAS, ASSIGNOR OF ONE-HALF TO ISER H. NAKDIMEN AND ONE-HALF TO HAROLD P. GALBREATH, BOTH OF FORT SMITH, ARKANSAS

SLACK ADJUSTER

Application filed August 26, 1929. Serial No. 388,518.

My invention relates to brake adjusters for railway cars and the like and it consists in the constructions, arrangements and combinations herein described and claimed.

In order to obtain the same braking force or braking pressure upon all trucks of a car it is essential that the piston travel in the braking cylinder shall be the same on the cars.

The brake shoe pressure is the result of the brake cylinder pressure and the pressure developed in the brake cylinder depends on the brake cylinder volume into which the air from the auxiliary reservoir expands when an application of the brake is made. The brake cylinder volume depends on the piston travel and it increases with the travel. Therefore, when the piston travel is long, the brake cylinder pressure will be less than when the travel is short, because the amount of air that enters the brake cylinder is dependent on the brake pipe reduction. Therefore, the same amount of air passes through the brake cylinder whether the piston travel is long or short. The braking force will be greater on a car with a short piston travel and this car with the brakes well applied will stop sooner than a car on which the piston travel is longer.

An unequal piston travel is undesirable as it causes shocks when the trains are stopped, on account of the unequal braking forces that are developed on the various cars. Unequal braking forces are also liable to cause the wheels to slide when the brakes are applied and flatten them perhaps to the extent that they must be discarded. Also, as frequently happens, due to unequal braking action of the wheels, the wheels become hot and often burst, resulting in serious accidents.

It is therefore a purpose of my invention to automatically maintain a predetermined and uniform running piston travel by the use of positive means such as reciprocating levers, gears and springs.

It is a further object to provide a brake slack adjuster which may be operated manually from either side of the car, independent of the automatic feature; and it is also an object to provide a construction wherein the brake piston travel may be adjusted at one given point, thus eliminating the necessity of making stationary adjustments at different points on a car.

It is a still further object of my invention to provide an adjusting means which eliminates the necessity of an employee getting underneath a car to adjust the slack in the brake rigging, thus subjecting himself to injury and possibly death.

Additional objects, advantages and features of invention will be apparent from the following description and accompanying drawings wherein, Figure 1 is a plan view of a railway car equipped with my invention, Figure 2 is a side elevation of my adjusting device, Figure 3 is an enlarged top plan view thereof, Figure 4 is an end view thereof, Figure 5 is a cross section on the line 5—5 of Fig. 3, Figure 6 is a cross section on the line 6—6 of Fig. 2 illustrating the sliding support and operating means for the fulcrum, Figure 7 is a detail sectional view of the spring adjusting means, and Figure 8 is a detail perspective view of the connection between the piston rod and adjusting mechanism.

In carrying out my invention a car 1 is provided, which may be of any usual construction having trucks 2 at the front and rear thereof supported by wheels 3, brake shoes 4 being disposed adjacent the wheels 3 to effect a braking action upon manipulation of a usual brake rigging 5. The brake rigging 5 is connected to levers 6 and 7 as shown in Fig. 1, and to the outer extremity of the lever 6 there is pivotally mounted a live cylinder lever 8, which is provided at one end with a manual brake operating means 9. Intermediate the length of the lever 8, a link 10 is connected, which link is extended rearwardly and connected to a floating lever 11. One end of the lever 11 is connected to the lever 7, as at 12.

An air brake cylinder 13 is suitably mounted upon the car 1, having its piston rod 14 connected to the live cylinder lever 8, as is customary. It will thus be seen that the brakes 4 may be operated either manually through the means 9 or by air-pressure by virtue of the air pipe connections 15.

It should be noted that the floating lever 11 is not directly fulcrumed upon the framing of the car 1, but is pivotally connected to my slack adjuster, which will now be described.

Reference is now made to Figures 2 and 3, wherein it will be seen that my adjuster comprises a casting 16 of elongated form, having side walls 17 and supporting flanges 18, and an end wall 19 forming a bearing 19'. The walls 17 each have a slot 20 extending throughout the major portion of the walls 17, as clearly shown in Figure 2, adapted to receive a sliding fulcrum 21, as will be described hereinafter.

Adjacent the closed end 19 of the casting 16, there is provided a diagonally extending bearing 22, and slightly to the rear thereof and extended downwardly and offset to one side of the bearing 22 there is an arm 23, adapted to afford a seat for a spring tension means.

Journalled within the bearing 19' there is a screw-threaded shaft 24 which is threadedly engaged in the cross-head 26 of the sliding fulcrum 21. The cross-head 26 has laterally extending bearing arms 27, adapted for sliding engagement within the slots 20, as shown.

The shaft 24 has a worm gear 28 fixed thereon snugly abutting the end 19 of the casting. The shaft 24 may be secured in proper position by a pin 29 closely adjacent the bearing 19'.

The sliding fulcrum 21 is apertured for pivotal connection to the floating lever 11, as at 30, in Figures 1 and 2.

Attention is now directed to Figure 2, wherein it will be noted that the arm 22 has a bearing 31 at its extremity, disposed in a vertical medial line with the gear 28, and within this bearing, there is revolubly mounted a transverse shaft 32, having keyed thereon a worm screw 33 adapted to mesh with the worm gear 28. The worm screw 33 preferably abuts the bearing 31 and thus prevents lateral movement of the shaft, which might otherwise occur, and upon the opposite side of the bearing, I provide a ratchet gear 34 suitably splined upon the shaft 32, as shown in Figure 5.

Upon that portion of the shaft 32 extending beyond the gear 34 there is swingably mounted a tubular shaft 35, which has an operating lever 36 and a pawl-supporting lever 37. The lever 36 is extended downwardly and is connected to a link 38 extended rearwardly beneath the casting 16. The rearwardly extending portion of the link 38 is slidably supported by a piston-operated lever 40. The lever 40, in the present instance, is of angular formation providing arms 41 and 42. The arm 41 terminates in a clamp collar 43 adapted to be secured to the rod 14. The extremity of the link 38 is screw-threaded and engaged within an adjusting nut 44 slidably carried by the arm 42.

Attention is now invited to Figures 2, 3 and 4, wherein it is shown that the arm 37 has an angularly disposed arm 45, formed integrally therewith, upon the outer portion of which there is pivotally mounted a pawl 46 adapted to engage the teeth of the ratchet wheel 34. In order to hold the pawl 46 in engagement with the teeth of the ratchet wheel 34, the lower portion of the arm 37 is cupped to receive one end of a tension spring 47. The other end of the spring 47 is retained within a housing 48 formed upon the lower end of the arm 23, as clearly shown in Figures 3 and 7. The tension of the spring 47 may be varied by manipulation of the adjusting screw 49.

From the foregoing, it will be readily apparent that my slack adjuster may be readily incorporated with any of the well known brake riggings, by merely removing the usual fulcrum bracket supporting the floating lever 11 and substituting my adjusting device 16, the connections thereto being made as described.

With my device installed upon a car and it is desired to adjust the slack in the brake rigging the shaft 32 is rotated, from either side of the car, until all slack is taken out of the brake rigging, and the brake shoes 4 fit snugly against the wheels 3. This reduction of slack is brought about in the following manner:—As the shaft 32 is rotated, the worm screw 33 is likewise rotated which in turn rotates the worm gear 28, and since the gear 28 is keyed upon the screw-threaded shaft 24, this shaft is consequently rotated, and due to such rotation, the cross-head 26 is moved longitudinally within the slots 20, resulting in movement of the brake rigging, as will be apparent. With the brake-shoes snugly engaging the wheels, the pawl 46 is raised to release the ratchet wheel 34, whereupon the shaft 32 is rotated to produce a slack in the brake rigging corresponding to the amount of standing piston travel. The pawl 46 may now be released so as to again engage the ratchet wheel.

To automatically maintain a predetermined running piston travel, the nut 44 is adjusted upon the link 38, so that the distance between the adjusting nut 44 and trip 39 is equal to the distance of a predetermined running piston travel, less one-half inch, which is allowed for lost motion and the like. As an illustration, it is desired to maintain automatically, an 8-inch running piston travel. The adjusting nut 44 is spaced seven and one-half inches from the trip 39.

From the foregoing, the operation of my device will be readily apparent, but as an illustration, we will say that the slack adjuster has been set to automatically maintain an 8-inch running piston travel. When the brakes are applied, the brake-cylinder piston and its associated rod 14 moves outward, and so long as the piston travel does not exceed 8 inches, the slack adjusting device remains idle; but in the event that the piston travel exceeds the 8 inches, the trip 39 strikes the nut 44 and pulls the link 38. Such pulling movement upon the link 38 rotates the shaft 35, by virtue of its connection with the arm 36, compressing the spring 47. Simultaneously with the movement of the shaft 35, the arm 45 is swung downwardly carrying the pawl 46 with it. When the brakes are released and the brake cylinder piston has returned to its normal position, there will be no pressure on the link 38 and consequently no pressure on the arm 36 or shaft 35, with the result that the tension of the spring 47 will force the lever 45 and its associated pawl 46 forwardly, and since the pawl 46 is engaged with one of the teeth of the ratchet wheel 34, rotary motion will be imparted to the gear 34, and consequently to the shaft 32. It will be seen that rotation of the shaft 32 will impart a rotation of the worm screw 33 which, in turn, rotates the worm gear 28 and screw-threaded shaft 24. Rotation of the shaft 24 will move the cross-head 27 inwardly, due to its screw-threaded engagement, and since the cross-head 27 is connected to the fulcrum end of the floating lever 11, the slack in the brake rigging is automatically taken up on all trucks, equally. As soon as the piston travel is brought to within the predetermined amount, the slack adjuster ceases to operate, until the piston again exceeds the predetermined travel.

If, due to false piston travel, the brake shoes do not have the proper clearance, or if they become too tight, the pawl 46 is raised so that the shaft 32 may be rotated to loosen the cross-head 26, which will consequently loosen the brake rigging. It will be understood, of course, that it is not necessary to release the pawl, when it is desired to tighten the brakes.

In conclusion, it is important to emphasize that it is the brake cylinder piston that is the source of power for operating the device, for which purpose, the lever 40 may be fastened to the piston rod 14 as shown, or either to the piston push rod or live cylinder lever. The angular form of the lever 40 in Fig. 8 is not necessarily adhered to because it can be made straight with means at the ends as may be suitable for its connection with the link 38 and piston rod 14.

I claim:—

1. A slack adjuster for brakes of railway cars and the like comprising brake riggings, floating levers connected thereto and connected with each other, brake operating means including a reciprocating piston associated with one of said floating levers, a movable fulcrum connected to said other floating lever, means for moving said fulcrum including a shaft threadedly engaged with said fulcrum, a worm gear keyed upon said shaft, a second shaft arranged transversely of said first-named shaft, a worm screw splined upon said second-named shaft and in mesh with said worm gear, a ratchet wheel keyed upon said transverse shaft, a hollow shaft swingably mounted thereon, means connecting said piston and said hollow shaft, and means to rotate said ratchet wheel upon movement of said piston beyond a predetermined distance.

2. A slack adjuster for brakes of railway cars and the like comprising brake rigging, floating levers connected thereto and connected with each other, brake operating means including a reciprocating piston associated with one of said floating levers, a movable fulcrum connected to said other floating lever, means for moving said fulcrum including a shaft threadedly engaged with said fulcrum, a worm gear keyed upon said shaft, a second shaft arranged transversely of said first-named shaft, a worm screw splined upon said second-named shaft and in mesh with said worm gear, a ratchet wheel keyed upon said transverse shaft, a hollow shaft swingably mounted thereon and having a pawl adapted to engage said ratchet wheel and means connecting said hollow shaft and said piston whereby on movement of said piston beyond a predetermined limit said hollow shaft will be swung.

3. A slack adjuster for brakes comprising a body having a threaded shaft revolubly mounted therein, a second shaft carried by said body and arranged transversely thereto, gears carried by said shafts and in mesh with each other, a ratchet wheel carried by said transverse shaft, a hollow shaft swingably mounted upon said transverse shaft, a spring-pressed pawl carried by said hollow shaft arranged to engage said ratchet wheel to rotate the same upon swinging of said hollow shaft in one direction, a link connecting said hollow shaft to a brake-operating means, adjustable means carried by said link and operatively associated with said brake operating means whereby on movement of said brake operating means beyond a predetermined limit said threaded shaft will be rotated, and a slidable brake lever fulcrum engaged upon said threaded shaft for longitudinal movement thereon upon rotation of said last-named shaft.

4. A slack adjuster for brakes comprising a body having a threaded shaft revolubly mounted therein, a brake lever fulcrum operatively associated with said shaft, a second shaft carried by said body and arranged transversely thereto, gears carried by said shafts and in mesh with each other, a hollow shaft swingably mounted on said transverse shaft, means for swinging said hollow shaft, means for rotating said transverse shaft upon swinging of said hollow shaft, and separate means for rotating said transverse shaft for longitudinal movement of said brake lever fulcrum, independently of said other named means.

5. The combination of a pair of trucks, brake rigging associated with each of said trucks comprising an operating link, a floating lever connected to each of said operating links, a link connection between said floating levers, a brake cylinder having a reciprocating piston, said piston being connected to one of said floating levers, a movable fulcrum connected to one of said other floating levers and having a screw threaded aperture, means for moving said fulcrum including a transverse shaft, a second shaft operatively associated with said transverse shaft for rotation thereof, said shaft having a screw threaded portion engaged in the screw threaded aperture of said fulcrum, and means connected between said piston and said transverse shaft for rotating said shaft upon travel of said piston beyond a predetermined distance to automatically compensate for slack in said brake rigging.

WILLIAM O. MARTIN.